United States Patent
Lection et al.

(10) Patent No.: US 10,453,232 B2
(45) Date of Patent: Oct. 22, 2019

(54) PRODUCT INSTALLATION ALIGNMENT ASSISTANCE

(71) Applicant: International Business Machines Corporation, Armonk, NY (US)

(72) Inventors: David B. Lection, Raleigh, NC (US); Sarbajit K. Rakshit, Kolkata (IN); Mark B. Stevens, Austin, TX (US); John D. Wilson, League City, TX (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/249,956

(22) Filed: Aug. 29, 2016

(65) Prior Publication Data

US 2018/0061053 A1   Mar. 1, 2018

(51) Int. Cl.
*G06T 11/60* (2006.01)

(52) U.S. Cl.
CPC .................................. *G06T 11/60* (2013.01)

(58) Field of Classification Search
CPC ........................... G06T 7/0044; G06T 19/006
USPC ........................................................ 345/633
See application file for complete search history.

(56) References Cited

U.S. PATENT DOCUMENTS

| | | | |
|---|---|---|---|
| 5,311,670 A | 5/1994 | Tomoiaga | |
| 5,479,713 A | 1/1996 | Wood | |
| 5,581,637 A | 12/1996 | Cass et al. | |
| 6,412,185 B1 | 7/2002 | Mills et al. | |
| 7,617,613 B2 | 11/2009 | Merryfield, Jr. | |
| 8,588,550 B2 | 11/2013 | Liu | |
| 2006/0265989 A1 | 11/2006 | Geary | |
| 2006/0285641 A1* | 12/2006 | Scherch | A61B 5/064 378/65 |
| 2008/0155939 A1 | 7/2008 | Jacobs | |
| 2014/0118339 A1* | 5/2014 | Davies | G06T 3/60 345/419 |
| 2014/0247279 A1* | 9/2014 | Nicholas | G06F 3/011 345/633 |
| 2016/0227133 A1* | 8/2016 | Jones | H04N 5/23293 |

OTHER PUBLICATIONS

Thomas Caudell and David Mizell. (1992). Augmented reality: An application of heads-up display technology to manual manufacturing processes. Proceedings of the Twenty-Fifth Hawaii International Conference on System Sciences. 2. 659-669 vol. 2.*

(Continued)

*Primary Examiner* — Shivang I Patel
(74) *Attorney, Agent, or Firm* — Christopher K. McLane; Maeve M. Carpenter (57) ABSTRACT

In an approach to alignment assistance, one or more computer processors receive one or more calibration parameters associated with an installation of a product. The one or more computer processors determine one or more boundaries for product registration associated with a receiving surface for the product. The one or more computer processors overlay, based, at least in part, on the received calibration parameters and the one or more boundaries for product registration, one or more alignment markings in a field of view of the receiving surface.

19 Claims, 5 Drawing Sheets

(56) References Cited

OTHER PUBLICATIONS

Pentenrieder et al (Katharina Pentenrieder, Christian Bade, Fabian Doil, and Peter Meier. 2007. Augmented Reality-based factory planning—an application tailored to industrial needs. In Proceedings of the 2007 6th IEEE and ACM International Symposium on Mixed and Augmented Reality (ISMAR '07). IEEE Computer Society, Washington, DC, USA, 1-9.*

M. Tuceryan and N. Navab, "Single point active alignment method (SPAAM) for optical see-through HMD calibration for AR," Proceedings IEEE and ACM International Symposium on Augmented Reality (ISAR 2000), Munich, 2000, pp. 149-158.*

* cited by examiner

PRODUCT INSTALLATION ALIGNMENT ASSISTANCE

BACKGROUND OF THE INVENTION

The present invention relates generally to the field of augmented reality, and more particularly to an alignment tool for product installation assistance.

Augmented reality comprises an area of known endeavor. Generally speaking, augmented reality comprises a live, direct (or indirect) view of a physical, real world environment having contents that are augmented by computer-generated sensory input such as visually-perceivable content. In many cases the augmented reality system aligns the overlaid imagery with specific elements of the physical world. Some augmented reality approaches rely, at least in part, upon a head-mounted display. These head-mounted displays often have the form-factor of a pair of glasses. Such displays place contrived images over a portion, though typically not all, of a user's view of the world. Such head-mounted displays are typically either optical see-through mechanisms or video-based mechanisms.

Augmented reality glasses may provide an enhanced view of the real world environment by incorporating computer-generated information with a view of the real world. Such display devices may further be remote wireless display devices such that the remote display device provides an enhanced view by incorporating computer-generated information with a view of the real world. In particular, augmented reality devices, such as augmented reality glasses, may provide for overlaying virtual graphics over a view of the physical world. As such, methods of navigation and transmission of other information through augmented reality devices may provide for richer and deeper interaction with the surrounding environment. The usefulness of augmented reality devices relies upon supplementing the view of the real world with meaningful and timely virtual graphics.

SUMMARY

Embodiments of the present invention disclose a method, a computer program product, and a system for alignment assistance. The method may include one or more computer processors receiving one or more calibration parameters associated with an installation of a product. The one or more computer processors determine one or more boundaries for product registration associated with a receiving surface for the product. The one or more computer processors overlay, based, at least in part, on the received calibration parameters and the one or more boundaries for product registration, one or more alignment markings in a field of view of the receiving surface.

DETAILED DESCRIPTION

When a construction material installer places a product such as shingles, tiles, bricks, etc., the installer may use several means to verify correct alignment of the product. For example, some products include guide markings integrated into the product. However, due to tolerances introduced by the product manufacturing process, the installer may periodically take measurements to ensure that the product does not become misaligned as installation progresses. In another example, the installer may snap a chalk line for alignment assistance which may be messy and require a second person for accurate placement. Setting up alignment markings, using additional guides or periodic measuring, takes time and may interfere with completing the installation in a minimum amount of time. Augmented reality glasses enable a user to merge a real world experience with a virtual world via a visual overlay to supplement what the user views. A connection to a computer network and various databases allows the augmented reality glasses to add information to the user's view of the environment through the overlay. Embodiments of the present invention recognize that efficiency may be gained by providing product placement assistance and alignment markings through augmented reality glasses worn by the installer, enabling the installer to concentrate on installing the product without having to continually stop to make measurements or place additional alignment markings. Implementation of embodiments of the invention may take a variety of forms, and exemplary implementation details are discussed subsequently with reference to the Figures.

Figure 1:
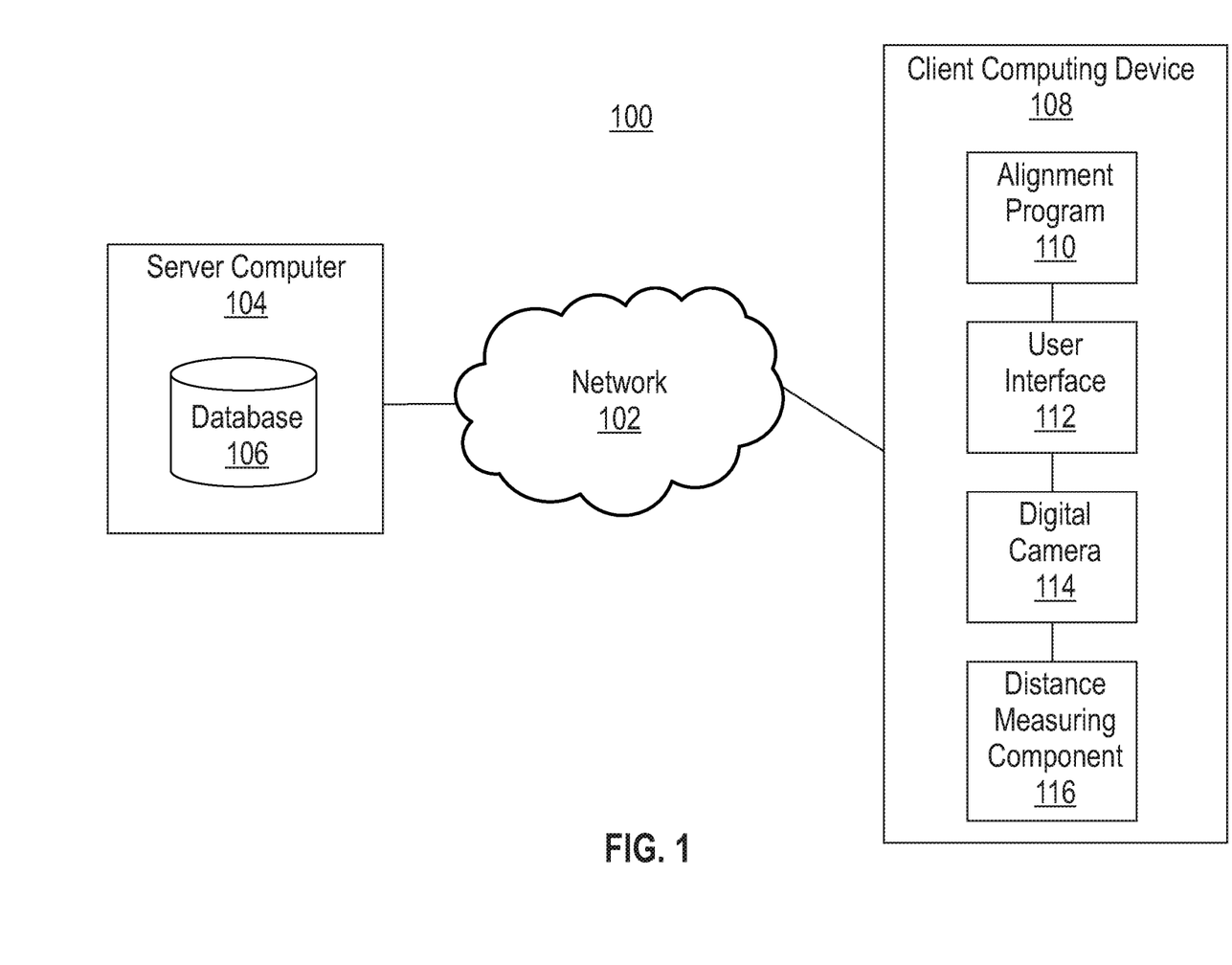
FIG. 1 is a functional block diagram illustrating an augmented reality data processing environment, in accordance with an embodiment of the present invention.

FIG. 1 is a functional block diagram illustrating an augmented reality data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Augmented reality data processing environment 100 includes server computer 104 and client computing device 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 104, client computing device 108, and other computing devices (not shown) within augmented reality data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 108 and other computing devices (not shown) within augmented reality data processing environment 100 via network 102. In another embodiment, server computer 104 represents a computing system utilizing clustered computers and components (e.g., database server computers, application server computers, etc.) that act as a single pool of seamless resources when accessed within augmented reality data processing environment 100. Server computer 104 includes database 106.

Database 106 is a repository for data used by alignment program 110. In the depicted embodiment, database 106 resides on server computer 104. In another embodiment, database 106 may reside on client computing device 108 or elsewhere within augmented reality data processing environment 100 provided alignment program 110 has access to database 106. A database is an organized collection of data. Database 106 can be implemented with any type of storage device capable of storing data and configuration files that can be accessed and utilized by server computer 104, such as a database server, a hard disk drive, or a flash memory. Database 106 stores one or more product knowledge bases that include information regarding product characteristics, installation parameters, and instructions associated with products that a user installs while utilizing alignment program 110 on client computing device 108.

Client computing device 108 can be a laptop computer, a tablet computer, a smart phone, or any programmable electronic device capable of communicating with various components and devices within augmented reality data processing environment 100, via network 102. Client computing device 108 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, client computing device 108 is a pair of augmented reality glasses. In general, client computing device 108 represents one or more programmable electronic devices or combination of programmable electronic devices capable of executing machine readable program instructions and communicating with other computing devices (not shown) within augmented reality data processing environment 100 via a network, such as network 102. Client computing device 108 includes alignment program 110, user interface 112, digital camera 114, and distance measuring component 116. In one embodiment, client computing device 108 may be a standalone device with functionality and data included such that connection to network 102 may not be needed. Client computing device 108 may include internal and external hardware components, as depicted and described in further detail with respect to FIG. 4.

Alignment program 110 assists a user with product installation by determining installation parameters and displaying alignment markings via client computing device 108. Alignment program 110 receives calibration parameters unique to the particular product the user is installing. After receiving an installation initiation, alignment program 110 determines a registration boundary for the installation of a first piece. Alignment program 110 overlays a product image in the user's field of view of the receiving surface to indicate where the user should install the product piece. Alignment program 110 overlays an alignment marking in the user's field of view to enable the user to line up the product piece in the correct orientation, according to the received parameters. Once a piece is installed, alignment program 110 receives an image of the installed product and determines whether the alignment of the installed product is acceptable. If the alignment is not acceptable, alignment program 110 alerts the user to adjust the alignment. Alignment program 110 is depicted and described in further detail with respect to FIG. 2.

User interface 112 provides an interface between a user of client computing device 108 and server computer 104. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 112 may also be mobile application software that provides an interface between a user of client computing device 108 and server computer 104. Mobile application software, or an "app," is a computer program designed to run on smart phones, tablet computers, wearable computers, and other mobile devices. User interface 112 enables a user of client computing device 108 to request product characteristics and installation parameters from database 106. User interface 112 also enables a user of client computing device 108 to see alignment markings, product placement cues, and other messages provided by alignment program 110. User interface 112 may also enable a user of client computing device 108 to configure parameters within alignment program 110. User interface 112 is depicted and described in further detail with respect to FIG. 3.

Digital camera 114 resides on client computing device 108. In another embodiment, digital camera 114 may reside on a second client computing device within augmented reality data processing environment 100 (not shown), provided the second client computing device is capable of communicating with client computing device 108 via network 102. A digital camera is a camera that encodes digital images and videos digitally and stores them for later reproduction. Digital camera 114 acts as an input device for client computing device 108. Digital camera 114 renders a digital image of an object selected by alignment program 110. In an embodiment where client computing device 108 is a pair of augmented reality glasses, digital camera 114 may be an integrated component of client computing device 108.

Distance measuring component 116 is one of a plurality of components known in the art, such as ultrasonic or laser based devices, which can measure distance using an image provided by digital camera 114. Alignment program 110 uses distance measuring component 116 to determine spacings, overlaps, placement locations, etc., needed to provide alignment assistance for product installation.

Figure 2:
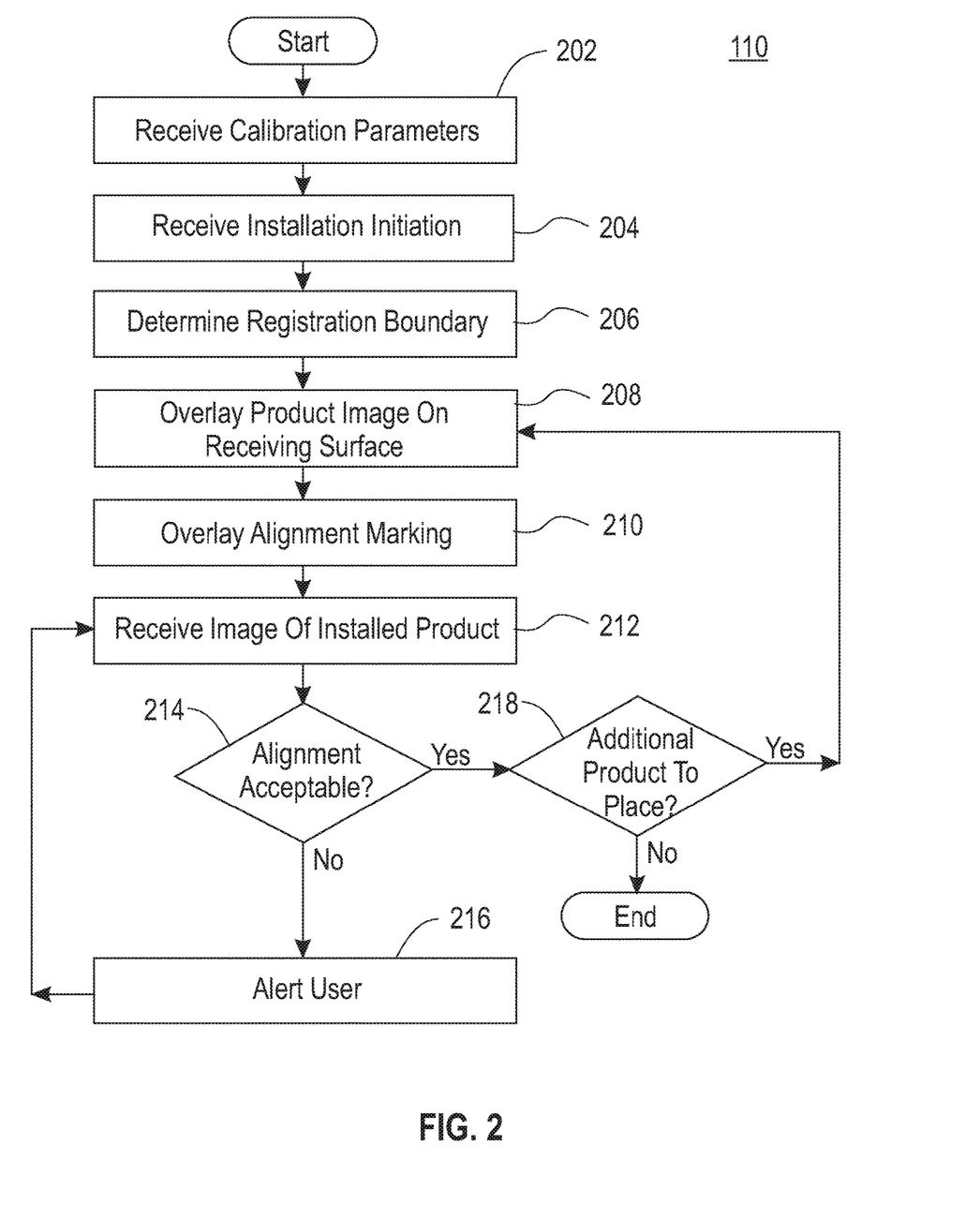
FIG. 2 is a flowchart depicting operational steps of an alignment program, on a client computing device within the augmented reality data processing environment of FIG. 1, for providing visual alignment assistance, in accordance with an embodiment of the present invention.

FIG. 2 is a flowchart depicting operational steps of alignment program 110, on client computing device 108 within augmented reality data processing environment 100 of FIG. 1, for providing visual alignment assistance, in accordance with an embodiment of the present invention.

Alignment program 110 receives calibration parameters (step 202). Various calibration parameters may exist, depending on the type of product the user is installing. A product is an article or commodity that requires alignment for proper installation, where alignment includes any adjustment to a line, such as leveling, spacing, angling, etc. Examples of products include, but are not limited to, shingles, tiles, bricks, flooring surfaces, deck boards, siding, patio blocks, and wallpaper. In order to assist with installation alignment, alignment program 110 needs the correct calibration parameters, such as product characteristics and installation parameters, for the particular product. Product characteristics may include, for example, dimensions, tolerances, or a pattern in which to place the product. Installation parameters may include, for example, spacing between product pieces, overlap of product pieces, or an offset between product pieces. In one embodiment, alignment program 110 receives the calibration parameters from the user. The user may image the product with digital camera 114 and input dimensions, install offsets, patterns, etc. via user interface 112, or alignment program 110 may derive product characteristics from the image. For example, if the product includes notches, registration marks, or targets that either come with the product or are placed by the user, then alignment program 110 can determine the location of those indicators from the product image. In another embodiment, alignment program 110 receives the calibration parameters by imaging or reading a product identifier, for example, a barcode, a radio frequency (RF) ID tag, or any other "internet of things" tag, associated with the product to access a product knowledge base, such as a manual, in database 106, via network 102. Alignment program 110 uploads the calibration parameters from the product knowledge base. In a further embodiment, the user may link alignment program 110 to a website associated with the product, via network 102, and alignment program 110 receives the calibration parameters from the website.

Alignment program 110 receives installation initiation (step 204). In one embodiment, alignment program 110 receives an indicator that the user is beginning an installation when the user manually starts alignment program 110, via user interface 112. For example, the user may speak the word "start" such that a component of client computing device 108 recognizes the audible command and readies alignment program 110 to begin an installation process. In another embodiment, the user may input, via user interface 112, a duration of time to elapse between receiving calibration parameters and initiating an installation process, after which alignment program 110 begins the installation process. In a further embodiment, alignment program 110 may determine that receiving an image of the product indicates an installation initiation. In yet another embodiment, where client computing device 108 includes a start button, alignment program 110 may receive installation initiation when the user presses the start button. In an embodiment where client computing device 108 is a pair of augmented reality glasses, alignment program 110 may track the user's eye gaze direction and receive installation initiation when the user looks at a start button displayed by user interface 112. In the embodiment, the user can interact with items displayed by user interface 112 via a plurality of mannerisms, including, but not limited to, gazing and blinking, or gazing at a spot for a particular length of time.

Alignment program 110 determines a registration boundary (step 206). Using digital camera 114, alignment program 110 determines a boundary on a receiving surface from which to register the first product piece to be installed. For example, if the product is a roof shingle, then the registration boundary may be the roof edge or roof peak. In another example, if the product is a floor board, then the registration boundary may be a door jamb or heating duct. In yet another example, if the product is wallpaper, then the registration boundary may be the corner of a room. In one embodiment, while determining the registration boundary, alignment program 110 can also take into account the full length of the receiving surface with respect to the product characteristics and installation parameters, and alter a specified parameter, such as spacing or overlap, to ensure a proper installation over the full receiving surface. For example, if the user is installing deck boards, alignment program 110 can reconfigure the recommended spacing between the boards to ensure that the last board on the deck is a full board that does not have to be trimmed.

Alignment program 110 overlays a product image on the receiving surface (step 208). In order to indicate a location and orientation for placement of the product, alignment program 110 overlays an image of the product in the user's field of view over the receiving surface in the correct placement location. The receiving surface is the surface on which the product is being placed. For example, if the product is a shingle, the receiving surface is a roof. In another example, if the product is a floor board or flooring tile, then the receiving surface is a floor. The user sees the overlaid image and can place the product in that location on the receiving surface. In one embodiment, alignment program 110 may also overlay additional placement indicators in the user's field of view. For example, when displaying a roof shingle, alignment program 110 may also display the optimum nail locations on the overlaid product image.

Alignment program 110 overlays an alignment marking (step 210). In order to indicate proper alignment of the product placement, alignment program 110 overlays an alignment marking in the user's field of view corresponding to the correct alignment of the product on the receiving surface. The alignment marking may be one or more of a plurality of markings that enable the user to visualize the accurate alignment of the product. For example, the alignment marking may be a colored or flashing line that is level with the registration boundary. In the example, the user may configure the line to be bright or dim, via user interface 112, depending on circumstances. In another example, the alignment marking may be an outline of the product in the position where the product is to be placed. In a further example, the alignment marking may be an arrow with associated instructional text, such as "Place here." The alignment marking may also indicate an acceptable range of placement values. For example, the alignment marking may be two parallel lines indicating acceptable alignment is between the two lines. Alignment program 110 uses the received calibration parameters to place the alignment marking in accordance with the product installation parameters, such as distance, offsets, gaps, patterns, overlaps, etc. If the user is installing the first piece of the product, alignment program 110 may overlay the alignment marking in the user's field of view in association with one or more registration boundaries. In an embodiment where client computing device 108 is a pair of augmented reality glasses, alignment program 110 accounts for changes in the user's head aspect and levelness, parallax, eye gaze direction, etc., using one or more techniques known in the art, via digital camera 114, distance measuring component 116, and other components in client computing device 108 (not shown), in order to ensure that the overlaid alignment mark and the overlaid product image are continually updated in the user's field of view to remain in an accurate position, relative to the receiving surface. In an embodiment where client computing device 108 is a pair of augmented reality glasses, steps 208 and 210 may be repeated each time the user's head moves until the product piece installation is complete.

In one embodiment, step 208 may be an optional step if alignment program 110 performs step 210. In another embodiment, step 210 may be an optional step if alignment program 110 performs step 208.

Alignment program 110 receives an image of an installed product (step 212). After the user completes the installation of a product piece, alignment program 110 receives an image of the installed product. In one embodiment, the user may manually image the installed product using digital camera 114. In another embodiment, alignment program 110 may determine a product piece is installed if the user does not touch or move the piece for a pre-defined duration of time, for example, five seconds, after which alignment program 110 instructs digital camera 114 to capture an image of the installed product. In a further embodiment, the user may indicate to alignment program 110, via user interface 112, that the product is installed which causes alignment program 110 to instruct digital camera 114 to capture an image of the installed product. In an embodiment where client computing device 108 is a pair of augmented reality glasses, and digital camera 114 is an integrated component, alignment program 110 captures the image of the installed product.

Alignment program 110 determines if the alignment of the installed product is acceptable (decision block 214). Using image analysis, alignment program 110 compares the placement of the installed product in the received image with the received calibration and installation parameters to determine whether the installed product meets a pre-defined placement accuracy threshold. For example, the installation parameters may define that spacing between tiles is at least 0.95 centimeters but no more than 1.05 centimeters. In another example, installation parameters may define that the product overlap has to be within ten percent of a target value.

If alignment program 110 determines the alignment is not acceptable ("no" branch, decision block 214), then alignment program 110 alerts the user (step 216). In an embodiment where client computing device 108 is a pair of augmented reality glasses, alignment program 110 alerts the user of unacceptable alignment by displaying a visual message in the user's field of view. The message may include text, arrows, outlines, etc. In another embodiment, alignment program 110 may alert the user via haptic feedback, such as by causing client computing device 108 to vibrate. In a further embodiment, alignment program 110 may alert the user via audible sounds or messages. In one embodiment, the user may configure alignment program 110 such that alignment program 110 does not overlay alignment markings, as discussed with respect to step 210, but instead the user relies on alignment program 110 to alert the user via other methods, as described above, when a product piece is installed incorrectly. After alerting the user, alignment program 110 returns to step 212 to receive an image of the installed product following the user adjusting the placement.

If alignment program 110 determines the alignment is acceptable ("yes" branch, decision block 214), then alignment program 110 determines whether there is additional product to place (decision block 218). In one embodiment, alignment program 110 determines whether there is additional product to place by querying the user, via user interface 112. For example, the query may be in the form of visible or audible message. In another embodiment, alignment program 110 determines whether there is additional product to place by receiving an indication from the user that installation is complete. For example, the user may tap a button on client computing device 108 when the job is complete. In a further embodiment, alignment program 110 may determine whether there is additional product to place by determining that a pre-defined quantity of pieces have already been placed.

If alignment program 110 determines there is additional product to place ("yes" branch, decision block 218), then alignment program 110 returns to step 208. If alignment program 110 determines there is no additional product to place ("no" branch, decision block 218), then alignment program 110 ends.

In an embodiment, a supervisor responsible for quality assurance of a product installation can use alignment program 110 to check the work of one or more installers. In the embodiment client computing device 108 is a pair of augmented reality glasses, and the supervisor views a fully or partially installed product. Alignment program 110 receives an image of the installed product, as discussed with respect to step 212, and determines whether the product alignment is acceptable, as discussed with respect to step 214. If alignment program 110 determines the alignment is not acceptable, then alignment program 110 alerts the supervisor.

FIGS. 3A through 3D illustrate examples 300 of user interface 112 displays by alignment program 110, on client computing device 108 within augmented reality data processing environment 100 of FIG. 1, in accordance with an embodiment of the present invention for an embodiment where client computing device 108 is a pair of augmented reality glasses.

Figure 3A:
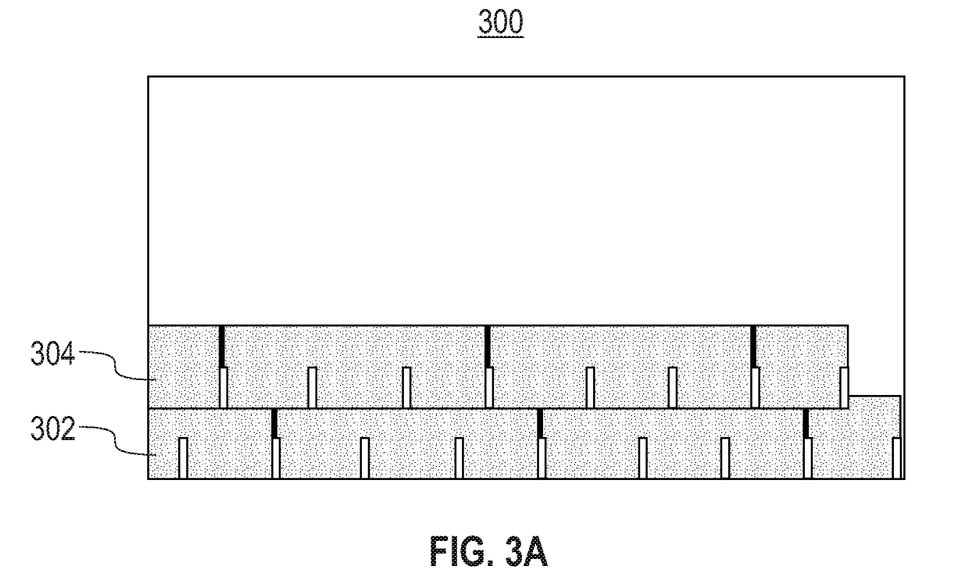
FIGS. 3A through 3D illustrate examples of user interface displays by the alignment program, on the client device within the augmented reality data processing environment of FIG. 1, in accordance with an embodiment of the present invention.

FIG. 3A depicts a view of two rows of shingles as seen by a user of client computing device 108. Row 302 is the first row of shingles and row 304 is the second row of shingles. The user has completed the installation of rows 302 and 304.

Figure 3B:
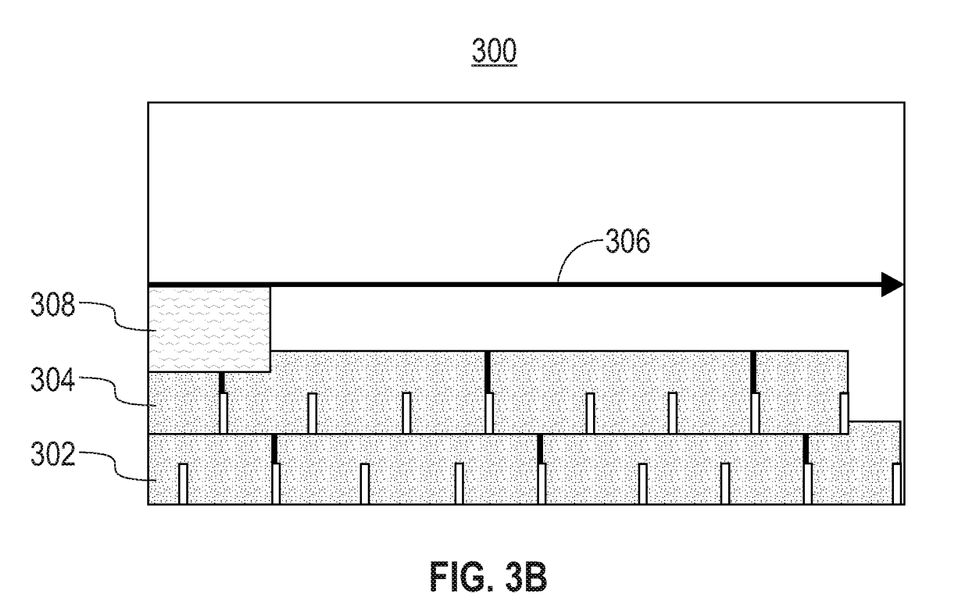

FIG. 3B depicts the same view as FIG. 3A, with the addition of alignment marking 306 and shingle image 308. Alignment program 110 overlays alignment marking 306 and shingle image 308, via user interface 112, on the user's view of rows 302 and 304. Alignment program 110 places shingle image 308 in the user's field of view such that alignment program 110 instructs the user to place the next shingle in the position in which shingle image 308 is placed. Alignment marking 306 indicates level alignment, as well as the direction of installation. Thus accurate installation should result when the user aligns a product piece with shingle image 308 and alignment marking 306.

Figure 3C:
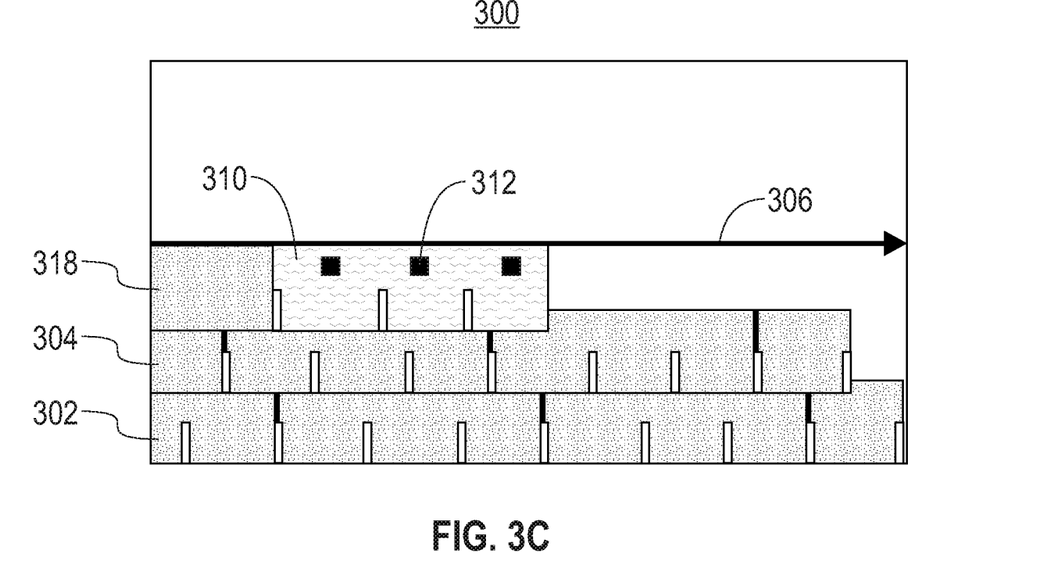

FIG. 3C depicts the same view as FIG. 3B, with the addition of shingle image 310, and the replacement of shingle image 308 with shingle 318 after the user installed shingle 318. Alignment program 110 overlays alignment marking 306 and shingle image 310, via user interface 112, on the user's view of rows 302 and 304, adjacent to shingle 318. In addition, alignment program 110 overlays nail locations 312 onto shingle image 310 to indicate the optimum locations for the user to nail the next shingle. Alignment program 110 may have received the optimum nail locations with the calibration parameters, as discussed with respect to step 202 of FIG. 2.

Figure 3D:
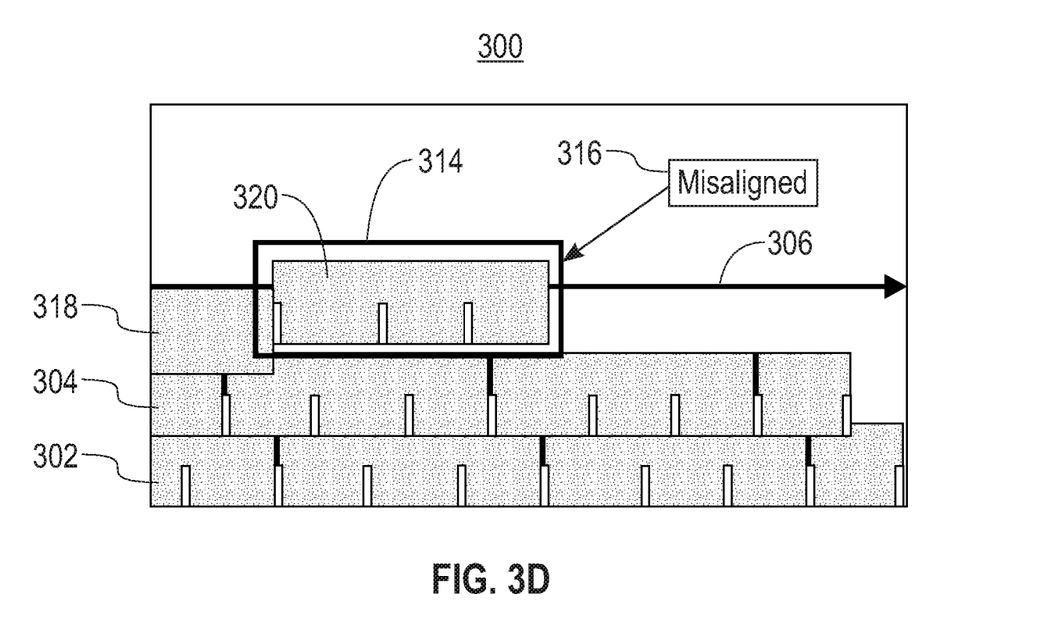

FIG. 3D depicts the same view as FIG. 3C, but with the replacement of shingle image 310 with shingle 320 after the user installed shingle 320. The user installed shingle 320 above alignment marking 306. Alignment program 110 determined that the alignment of shingle 320 is not acceptable. In the depicted embodiment, alignment program 110 alerts the user of the misalignment by displaying box 314 surrounding shingle 320 in the user's field of view as well as text message 316 that includes an arrow pointing to box 314 and the word "misaligned."

Figure 4:
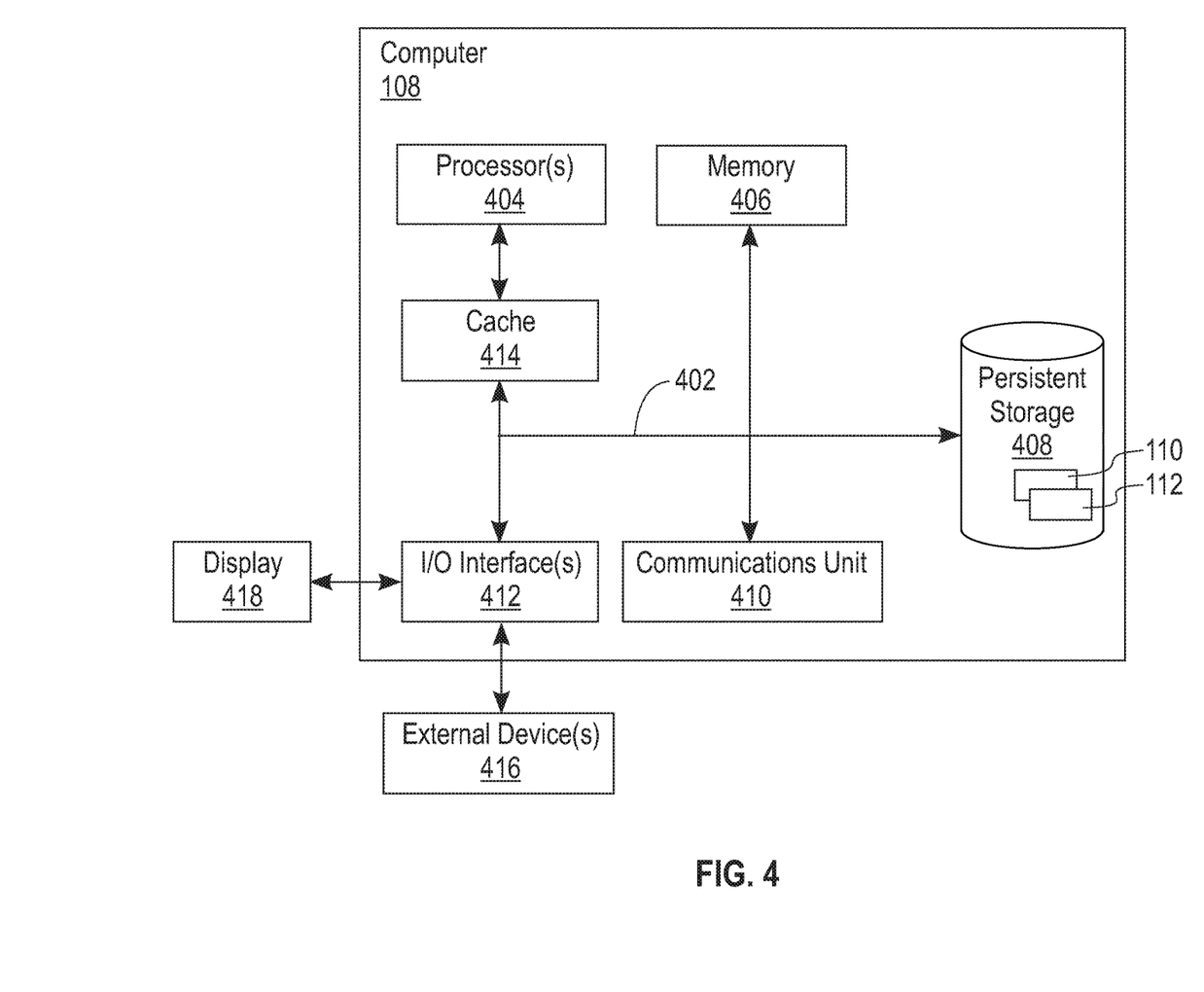
FIG. 4 depicts a block diagram of components of the client computing device executing the alignment program within the augmented reality data processing environment of FIG. 1, in accordance with an embodiment of the present invention.

FIG. 4 depicts a block diagram of components of client computing device 108 within augmented reality data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Client computing device 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., alignment program 110 and user interface 112 can be stored in persistent storage 408 for execution and/or access by one or more of the respective processor(s) 404 of client computing device 108 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server computer 104. In these examples, communications unit 410 includes one or more network interface cards. Communications unit 410 may provide communications through the use of either or both physical and wireless communications links. Alignment program 110 and user interface 112 may be downloaded to persistent storage 408 of client computing device 108 through communications unit 410.

I/O interface(s) 412 allows for input and output of data with other devices that may be connected to client computing device 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., alignment program 110 and user interface 112 on client computing device 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor or the lenses of a head mounted display. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for alignment assistance, the method comprising:

receiving, by one or more computer processors, one or more calibration parameters associated with a placement of one or more products onto a receiving surface for an installation, wherein the product is one or more construction materials, and wherein the receiving surface is a surface on which the one or more products are being placed;

determining, by the one or more computer processors, one or more boundaries associated with the receiving surface for placement of a first product of the one or more products;

creating, by the one or more computer processors, based, at least in part, on the received calibration parameters and the determined one or more boundaries, one or more alignment markings, wherein the alignment markings are virtual graphics;

overlaying, by the one or more computer processors, the one or more alignment markings in a field of view of an augmented reality device worn by a user viewing the receiving surface, wherein the augmented reality device is positioned between the user and the receiving surface;

comparing, by the one or more computer processors, an image of a placement of the installed one or more products to the received calibration parameters;

determining, by the one or more computer processors, whether the installation of the one or more products meets a pre-defined placement accuracy threshold, wherein the pre-defined placement accuracy threshold is ten percent of a target value of at least one of the one or more received calibration parameters; and responsive to determining the installation of the one or more products does not meet the pre-defined placement accuracy threshold, generating, by the one or more computer processors, a visual alert displayed by the augmented reality device, wherein the visual alert is generated after the user does not touch the installed one or more products for a pre-defined duration of time.

2. The method of claim 1, further comprising receiving, by the one or more computer processors, an indicator that the user is beginning the installation of the product.

3. The method of claim 1, further comprising, based, at least in part, on the received calibration parameters and the determined one or more boundaries, overlaying, by the one or more computer processors, one or more images of the product in the field of view of the user of the augmented reality device viewing the receiving surface.

4. The method of claim 1, further comprising:
responsive to determining an alignment of the installed one or more products is not acceptable, alerting, by the one or more computer processors, the user.

5. The method of claim 4, wherein alerting the user includes a visual message, a haptic feedback, a vibration, an audible sound, and an audible message.

6. The method of claim 1, wherein the one or more calibration parameters include at least one of a product characteristic or an installation parameter, and wherein the product characteristic is selected from the group consisting of a dimension, a tolerance, and a placement pattern, and wherein the installation parameter is selected from the group consisting of a spacing between two or more product pieces, an overlap of two or more product pieces, and an offset between two or more product pieces.

7. The method of claim 1, wherein receiving one or more calibration parameters associated with a placement of one or more products onto a receiving surface for an installation further comprises:
reading, by the one or more computer processors, a product identifier associated with the product; and
uploading, by the one or more computer processors, one or more calibration parameters from a product knowledge base associated with the product identifier.

8. The method of claim 1, further comprising:
determining a size of the receiving surface; and
altering, by the one or more computer processors, at least one of the one or more calibration parameters to ensure proper installation associated with the size.

9. A computer program product for alignment assistance, the computer program product comprising:
one or more computer readable storage devices and program instructions stored on the one or more computer readable storage devices, the stored program instructions comprising:
program instructions to receive one or more calibration parameters associated with a placement of one or more products onto a receiving surface for an installation, wherein the product is one or more construction materials, and wherein the receiving surface is a surface on which the one or more products are being placed;
program instructions to determine one or more boundaries associated with the receiving surface for placement of a first product of the one or more products;
program instructions to create, based, at least in part, on the received calibration parameters and the determined one or more boundaries, one or more alignment markings wherein the alignment markings are virtual graphics;
program instructions to overlay the one or more alignment markings in a field of view of an augmented reality device worn by a user viewing the receiving surface, wherein the augmented reality device is positioned between the user and the receiving surface;
program instructions to compare an image of a placement of the installed one or more products to the received calibration parameters;
program instructions to determine whether the installation of the one or more products meets a pre-defined placement accuracy threshold, wherein the pre-defined placement accuracy threshold is ten percent of a target value of at least one of the one or more received calibration parameters; and
responsive to determining the installation of the one or more products does not meet the pre-defined placement accuracy threshold, program instructions to generate a visual alert displayed by the augmented reality device, wherein the visual alert is generated after the user does not touch the installed one or more products for a pre-defined duration of time.

10. The computer program product of claim 9, the stored program instructions further comprising program instructions to receive an indicator that the user is beginning the installation of the product.

11. The computer program product of claim 9, the stored program instructions further comprising, based, at least in part, on the received calibration parameters and the determined one or more boundaries, program instructions to overlay one or more images of the product in the field of view of the user of the augmented reality device viewing the receiving surface.

12. The computer program product of claim 9, the stored program instructions further comprising:
responsive to determining an alignment of the installed one or more products is not acceptable, program instructions to alert the user.

13. The computer program product of claim 12, wherein the program instructions to alert the user includes a visual message, a haptic feedback, a vibration, an audible sound, and an audible message.

14. The computer program product of claim 9, wherein the one or more calibration parameters include at least one of a product characteristic or an installation parameter, and wherein the product characteristic is selected from the group consisting of a dimension, a tolerance, and a placement pattern, and wherein the installation parameter is selected from the group consisting of a spacing between two or more product pieces, an overlap of two or more product pieces, and an offset between two or more product pieces.

15. A computer system for alignment assistance, the computer system comprising:
one or more computer processors;
one or more computer readable storage devices;
program instructions stored on the one or more computer readable storage devices for execution by at least one of the one or more computer processors, the stored program instructions comprising:
program instructions to receive one or more calibration parameters associated with a placement of one or more products onto a receiving surface for an installation, wherein the product is one or more construction materials, and wherein the receiving surface is a surface on which the one or more products are being placed;
program instructions to determine one or more boundaries associated with the receiving surface for placement of a first product of the one or more products;

program instructions to create, based, at least in part, on the received calibration parameters and the determined one or more boundaries, one or more alignment markings, wherein the alignment markings are virtual graphics;

program instructions to overlay the one or more alignment markings in a field of view of an augmented reality device worn by a user viewing the receiving surface, wherein the augmented reality device is positioned between the user and the receiving surface;

program instructions to compare an image of a placement of the installed one or more products to the received calibration parameters;

program instructions to determine whether the installation of the one or more products meets a pre-defined placement accuracy threshold, wherein the pre-defined placement accuracy threshold is ten percent of a target value of at least one of the one or more received calibration parameters; and responsive to determining the installation of the one or more products does not meet the pre-defined placement accuracy threshold, program instructions to generate a visual alert displayed by the augmented reality device, wherein the visual alert is generated after the user does not touch the installed one or more products for a pre-defined duration of time.

16. The computer system of claim 15, the stored program instructions further comprising program instructions to receive an indicator that the user is beginning the installation of the product.

17. The computer system of claim 15, the stored program instructions further comprising, based, at least in part, on the received calibration parameters and the determined one or more boundaries, program instructions to overlay one or more images of the product in the field of view of the user of the augmented reality device viewing the receiving surface.

18. The computer system of claim 15, the stored program instructions further comprising:
responsive to determining an alignment of the installed one or more products is not acceptable, program instructions to alert the user.

19. The computer system of claim 18, wherein the program instructions to alert the user includes a visual message, a haptic feedback, a vibration, an audible sound, and an audible message.

* * * * *